Figure 1:
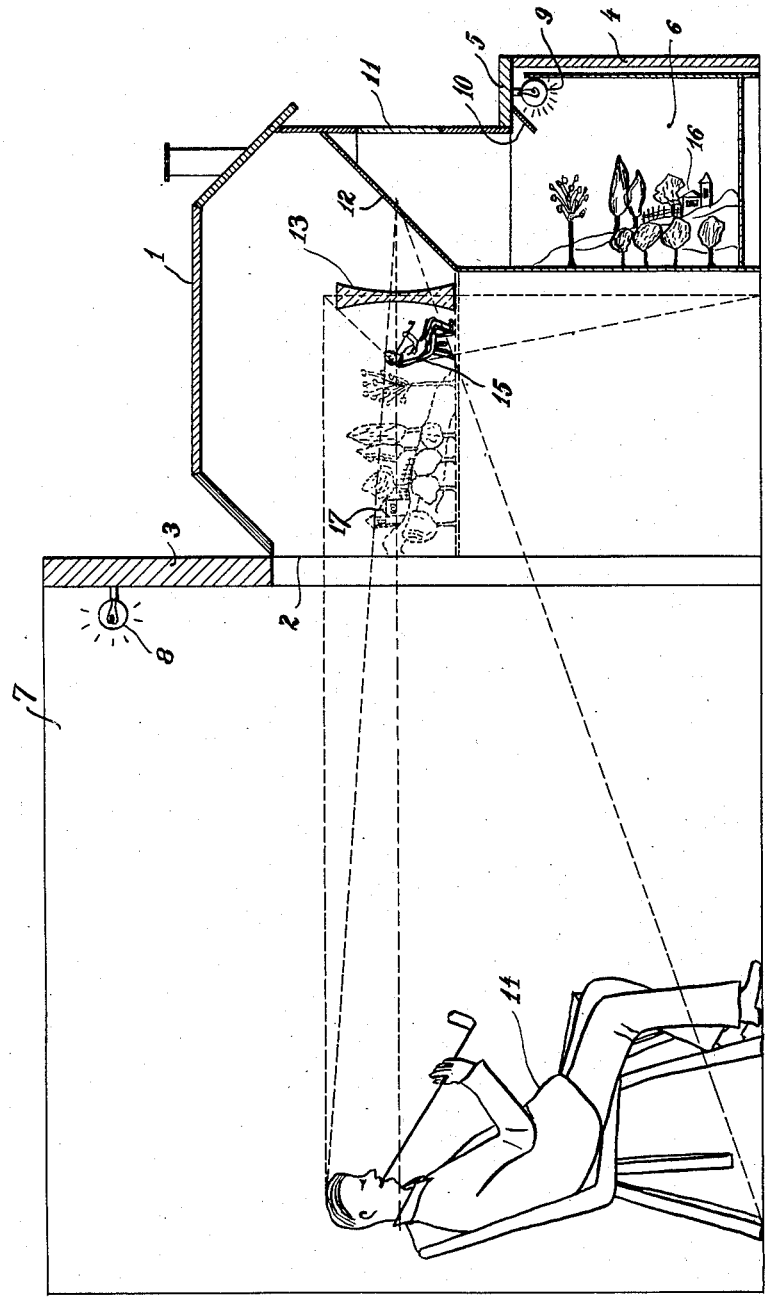

Feb. 18, 1941.     A. GRUENHUT     2,232,110
ILLUSION CREATING DISPLAY AND ADVERTISING DEVICE
Filed Oct. 18, 1939     2 Sheets-Sheet 1

INVENTOR.
Alfred Gruenhut
BY
ATTORNEY

Feb. 18, 1941.   A. GRUENHUT   2,232,110
ILLUSION CREATING DISPLAY AND ADVERTISING DEVICE
Filed Oct. 18, 1939   2 Sheets-Sheet 2
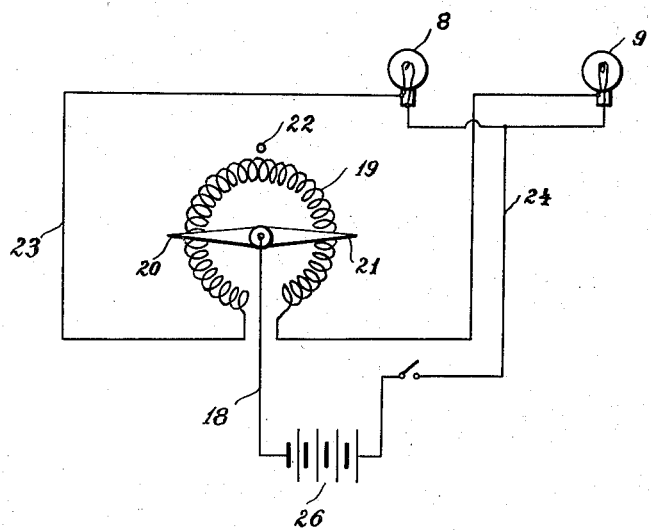
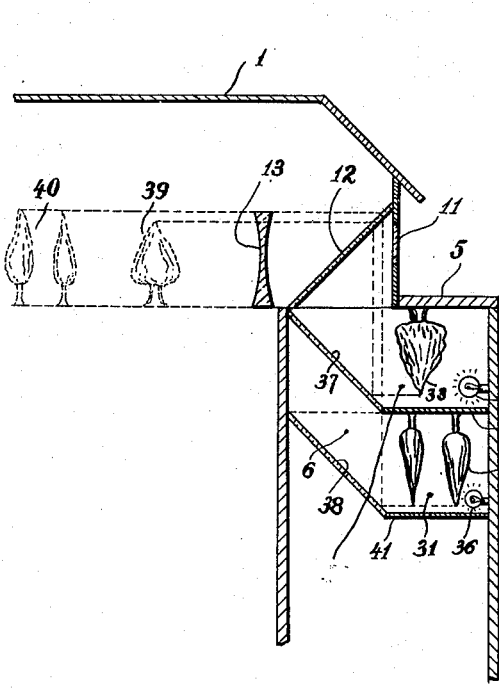
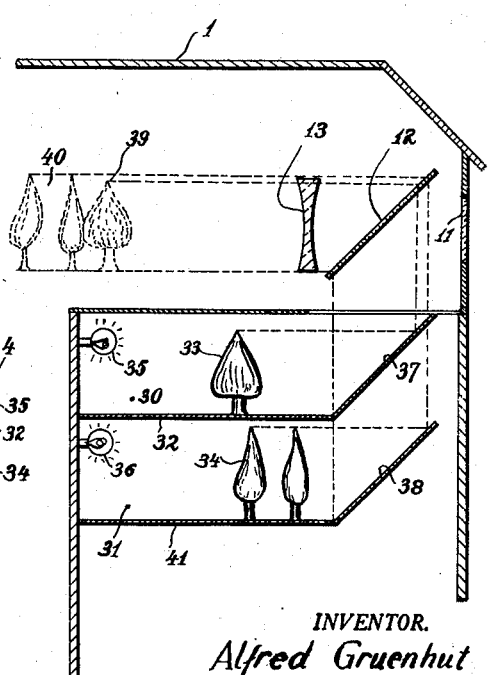
INVENTOR.
Alfred Gruenhut
BY
ATTORNEY.

Patented Feb. 18, 1941

2,232,110

UNITED STATES PATENT OFFICE 2,232,110

ILLUSION CREATING DISPLAY AND ADVERTISING DEVICE

Alfred Gruenhut, New York, N. Y., assignor to Yermie Stern Commercial Attractions, Inc., New York, N. Y.

Application October 18, 1939, Serial No. 299,915

2 Claims. (Cl. 272—8)

This invention relates to an illusion creating display and advertising device. More particularly, the invention relates to an illusion creating device where different images are created within a miniature or dummy house or the like. The persons or objects which correspond to the images created within the miniature house are contained in two different spaces or rooms one of which may be subdivided and which are arranged in such an inconspicuous manner that an observer viewing the images can not conceive the idea that the images are not actually contained in the miniature house.

Accordingly, it is an object of the invention to provide an illusion creating display and advertising device which allows to create within a miniature house different images of persons or objects contained in different spaces.

It is a further object of the invention to provide an illusion creating device of the type disclosed with two different spaces one of which may be subdivided and which are provided with illuminating means which are arranged to illuminate at will one of the several rooms while simultaneously making the other rooms darker or quite dark. Thus, while one of the images created within the miniature house fades another picture becomes brighter and a fading control is achieved.

It is still an object of the invention to provide an illusion creating device of the type disclosed with two different spaces one of which may be subdivided which are arranged in such an inconspicuous manner that an observer is effectively deceived about the origin of the images created in the dummy house.

It is still a further object of the invention to provide an illusion creating device of the type disclosed with two different spaces of which one is adapted to receive one or several still objects e. g. landscapes or the like while the other of the two spaces is adapted to receive moving objects e. g. a moving and acting person.

It is a further object of the invention to provide an illusion creating device where different images are created within a miniature or dummy house of which images one fades while another becomes brighter, thus creating an illusion which is particularly vivid and adapted to create attention.

With these and other objects in view an embodiment of the invention is shown by way of example in the accompanying drawings in which, Fig. 1 is a partial vertical section of a miniature house set against an opening in a wall, Fig. 2 is a schematic electric circuit for the lamps which serve to illuminate the rooms the images of which are created within the miniature house, and Figs. 3 and 4 are partial vertical sections of modifications of the invention showing how several still objects may be projected into a miniature house.

Referring more particularly to the drawings, 1 designates a miniature or dummy house set against an opening 2 in a wall 3 of the building in which the illusion creating device is displayed.

The miniature house 1 is supported by a platform having a front wall 4 and an upper wall 5. Walls 4 and 5 encase a space 6 which serves a purpose which will hereinafter become apparent. Behind wall 3 a similar, though larger space 7 is provided. Space 7 may be illuminated by one or several lamps 8 while space 6 may be illuminated by one or several lamps 9. A screen 10 may be provided to prevent direct rays of lamp 9 from reaching house 1. The miniature house 1 is provided with a glass window 11 through which the interior of the house may be observed.

Within house 1 a transparent mirror 12 is arranged, i. e. a mirror having a very thin silver layer as is well known in the art. Behind mirror 12 a lens or several lenses 13 are arranged which serve to produce a reduced image 15 within house 1 of the persons or objects 14 arranged in space 7.

Supposing lamp 8 to be very bright while lamp 9 is nearly dark, lens 13 will create a reduced image 15 of a person 14 or the like moving or acting in space 7. Mirror 12 will act in this case as an ordinary glass window. Of course, the space between lens 13 and opening 11 must be so large that the image 15 which is produced by lens 13 of the person 14 or the like seems to be within the space of house 1 in the mind of the observer looking through window 11. However, it is not necessary that the space between lens 13 and opening 11 is actually so large, that image 15 or image 17 which is produced by landscape 16 is completely contained within house 1 as long as the average observer will not notice the difference. Space 6 serves the purpose to house a landscape 16 or the like. Landscape 16 is made up of several three-dimensional miniature objects, such as trees and houses. In order to make the illusion more complete, no painted landscape should be used. When lamp 8 becomes darker or quite dark and when lamp 9 becomes brighter the image 15 of the person 14 will gradually disappear and the landscape 16 will be seen within house 1 the landscape 16 being projected as image 17 by means of mirror 12. Thus, while the one of the two images 15 and 17 fades the other image will appear within the house 1. It will be readily seen that by the use of the objects 14 and 16 very surprising illusion creating effects may be achieved. To the mind of the observer both images are created and move within the house 1. Space 6 serves to further increase the illusion because the platform formed by walls 4 and 5 is quite inconspicuous and most observers would not conceive the idea that the illusion is created within space 6 and behind wall 3.

In order to continuously make the one of the two lamps 8 and 9 brighter while the other lamp becomes darker the electric arrangement may be used which has been shown in Fig. 2. Current source 26 is connected by wire 18 to the rotatable arms 20 and 21 of double rheostat 19. Arms 20 and 21 may be turned until one of the arms moves against stop 22 in which case one of the two lamps 8 and 9 is nearly dark or entirely dark while the other lamp is very bright. The current is led from arm 20 over connection 23 to lamp 8 and thence to wire 24 connected with the other pole of the current source 26. Lamp 9 is fed over arm 21 of the rheostat and thence by means of wire 25 and lamp 9 is also connected with wire 24. Thus by rotating arms 20 and 21 of rheostat 19 the one of the two lamps 8 and 9 becomes brighter while the other becomes darker. If a plurality of lamps 8 and 9 is used a similar circuit may be used.

Of course, if desired, the one of the two lamps 8 and 9 may be connected with the current source while the other of the two lamps is disconnected. In this case rheostat 19 would not be required and the same may be replaced by a suitable switch.

In Fig. 3 a modification of the invention is shown. The illusion creating device of Fig. 3 comprises a space 7, similar to that in Fig. 1, but not shown in the drawings. This space serves for the reception of a living person. Space 6 is subdivided in two spaces 30 and 31 by means of partition wall 32. Landscape 33 or the like is arranged below wall 5 while landscape 34 is arranged below wall 32. Landscapes 33 and 34 are also made up of a plurality of three-dimensional miniature objects. Lamps 35 and 36 are provided below walls 5 and 32 respectively. Transparent mirror 37 is arranged adjacent transparent mirror 12 and serves to project landscape 33 into house 1 where it is seen as image 39 in house 1 in case bulb 35 is sufficiently bright. Mirror 38 arranged adjacent wall 41 projects landscape 34 which will be seen as image 40 in house 1. Images 39 and 40 are produced by mirrors 37 and 12, and by mirrors 38 and 12, respectively. Thus, it will be evident that images 39 and 40 have the same size as their respective objects 33 and 34, since the light rays emanating from objects 33 and 34 do not pass at all through lens 13. Thus, it will be seen that space 6 may be subdivided into several spaces of which each contains a landscape or a similar three-dimensional still object. By means of transparent mirrors and reflecting mirrors these several objects may all be projected at will into house 1.

In Fig. 4 another arrangement of mirrors 37 and 38 is shown. In this case, spaces 30 and 31 extend a larger distance to the left of Fig. 4 and below house 1.

In the embodiments of the invention shown in Figs. 3 and 4 the landscape is seen as image 39 within house 1, while the object 34 is projected as image 40 into house 1. When lamp 35 is bright, the rays emitted by object 33 are actually reflected by mirrors 37 and 12, and an observer looking through window 11 sees an image 39 within house 1. Similarly, the rays of light emanating from illuminated object 34 are reflected by mirror 38, pass transparent mirror 37 and are again reflected by mirror 12 to pass window 11. Thus, the image 40 is produced. By selectively darkening one of the lamps 35 and 36, one of the images 39 and 40 will disappear. When both lamps 35 and 36 are dark, the image 15 of the person 14 will be observed.

It is understood that the device shown represents one embodiment of the invention only.

I claim:

1. An illusion creating display and advertising device comprising a miniature house set in front and against an opening of a wall, said house being supported by a platform having a front wall and enclosing a space, a window in said house, a transparent mirror arranged behind said window and within said house, a lens arranged behind said mirror and within said house, said lens adapted to create within said house the reduced image of a person acting behind the opening in said wall, said mirror adapted to create within said house the image of a miniature landscape and the like arranged within the space enclosed by said platform, whereby the reduced image of said person and the image of said miniature landscape created within said house have a proportional size.

2. An illusion creating display and advertising device comprising a miniature house set in front and against an opening of a wall, said house being supported by a platform having a front wall and enclosing a space, a window in said house, a transparent mirror arranged behind said window and within said house, a lens arranged behind said mirror and within said house, said lens adapted to create within said house the reduced image of a person acting behind the opening in said wall, said space being subdivided into a plurality of chambers, a miniature landscape and the like being arranged within each of said chambers, each of said chambers being provided with a mirror adapted to create within said house the image of the landscape arranged in said chamber, the image of said person and the image of said landscape as created within said house being of proportional size.

ALFRED GRUENHUT.